(12) United States Patent
Chen et al.

(10) Patent No.: US 10,078,909 B1
(45) Date of Patent: Sep. 18, 2018

(54) VIDEO STREAM CUSTOMIZATION USING GRAPHICS

(71) Applicant: Facebook, Inc., Menlo Park, CA (US)

(72) Inventors: Crystal Rhan-Tsor Chen, Mountain View, CA (US); Lydia Han, San Francisco, CA (US); Aigerim Shorman, San Francisco, CA (US); Tanner Cotant Christensen, Redwood City, CA (US); Noah Bradley Blecher, San Francisco, CA (US); Daniil Burdakov, London (GB); Karthik Narayan, Mountain View, CA (US); Harshdeep Singh, Santa Clara, CA (US); Pradeep George Mathias, Mountain View, CA (US); Deepa Diwakar, Mountain View, CA (US); Tamar Bar Lev, London (GB); Christopher Jon Lang, Seattle, WA (US); Shupin Mao, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/596,777

(22) Filed: May 16, 2017

(51) Int. Cl.
| | |
|---|---|
| *G06F 3/0484* | (2013.01) |
| *G06Q 50/00* | (2012.01) |
| *G06N 99/00* | (2010.01) |
| *G06F 3/14* | (2006.01) |
| *G06T 11/60* | (2006.01) |

(52) U.S. Cl.
CPC .......... *G06T 11/60* (2013.01); *G06F 3/04842* (2013.01); *G06F 3/14* (2013.01); *G06N 99/005* (2013.01)

(58) Field of Classification Search
CPC .......... G06Q 30/0267; G06Q 30/0269; G06Q 50/01; G06F 3/0482; G06F 3/14; G06F 3/0481; G06N 99/0055; G06T 11/60; G06T 2207/20221; G09G 2340/12
USPC .................................................. 345/629-634
See application file for complete search history.

(56) References Cited

U.S. PATENT DOCUMENTS

| | | | |
|---|---|---|---|
| 9,600,803 B2 * | 3/2017 | Greenberg | .......... G06F 17/2247 |
| 2002/0018070 A1 * | 2/2002 | Lanier | ...................... G06F 3/14 |
| | | | 345/629 |
| 2011/0064388 A1 * | 3/2011 | Brown | .................... G06T 13/20 |
| | | | 386/285 |

(Continued)

*Primary Examiner* — Chante Harrison
(74) *Attorney, Agent, or Firm* — Fenwick & West LLP

(57) ABSTRACT

An online system customizes video conversations between users of the online system by providing graphics that are likely to interest the users. The online system may present composite views overlaying selected graphics on a video stream, which may be part of an augmented reality (AR) environment. The graphics include, for example, background graphics, masks, props, visual or particular effects, frames or borders, etc. The online system may use a machine learning model to predict whether a user is likely to select or interact with a particular graphic. The online system can also filter or rank graphics according to user affinities or user connections on the online system. Users may be encouraged to interact with the graphics that are customized to their specific interests, which can promote an engaging video conversation or AR experience.

17 Claims, 5 Drawing Sheets

(56) References Cited

U.S. PATENT DOCUMENTS

| | | | |
|---|---|---|---|
| 2011/0172797 A1* | 7/2011 | Jones | A43B 1/0054 |
| | | | 700/98 |
| 2015/0026642 A1* | 1/2015 | Wilson | G06F 3/0482 |
| | | | 715/825 |
| 2015/0091891 A1* | 4/2015 | Raheman | A63G 31/16 |
| | | | 345/419 |
| 2015/0234462 A1* | 8/2015 | Miller | G06F 3/013 |
| | | | 345/8 |
| 2016/0132216 A1* | 5/2016 | Jardan | G06F 3/04842 |
| | | | 705/347 |
| 2016/0182940 A1* | 6/2016 | Assayag | H04N 21/4312 |
| | | | 725/62 |
| 2016/0196584 A1* | 7/2016 | Franklin | G06Q 30/0267 |
| | | | 705/14.64 |
| 2016/0277802 A1* | 9/2016 | Bernstein | H04N 21/4788 |
| 2016/0294762 A1* | 10/2016 | Miller | H04L 51/32 |
| 2016/0294799 A1* | 10/2016 | Miller | H04N 21/4788 |
| 2016/0359777 A1* | 12/2016 | Tucker | H04L 51/10 |
| 2017/0006328 A1* | 1/2017 | Verticchio | H04N 21/4147 |
| 2017/0017352 A1* | 1/2017 | Kanter | G06F 3/0485 |
| 2017/0032553 A1* | 2/2017 | O'Donovan | G06N 7/005 |
| 2017/0060485 A1* | 3/2017 | Krilivsky | G06Q 30/0621 |
| 2017/0083524 A1* | 3/2017 | Huang | G06N 7/005 |
| 2017/0185254 A1* | 6/2017 | Zeng | G06F 3/0481 |
| 2017/0221371 A1* | 8/2017 | Yang | G08G 5/0013 |
| 2017/0330257 A1* | 11/2017 | Collier | G06Q 30/0621 |
| 2017/0352109 A1* | 12/2017 | Burns Zeldin | G06Q 30/08 |
| 2018/0032235 A1* | 2/2018 | Choi | G06T 11/60 |
| 2018/0033173 A1* | 2/2018 | Choi | G06T 11/60 |
| 2018/0191962 A1* | 7/2018 | Javier | H04N 5/265 |

* cited by examiner

US 10,078,909 B1

VIDEO STREAM CUSTOMIZATION USING GRAPHICS

BACKGROUND

This disclosure generally relates to customizing video streams or other media and particularly to providing pertinent graphics to customize video streams for users of an online system.

Users of an online system may communicate in real time using video conversations. For example, two users might each have a computing device that includes a camera, microphone, and speaker that enable the two users to talk to each other and see a video stream of each other. Providing users with a choice of graphics such as masks and other types of props to be overlaid in a video stream during a conversation could make the conversation more personalized and engaging to the users. However, not all available graphics may be of interest to the particular users of a video conversation. Further, if an online system presented many uninteresting graphics to users, it would be difficult for the users to manually sort and find a graphic that is actually desired for a video conversation. Thus, it is desirable for an online system to customize graphics for its users to provide engaging video conversations and encourage users to continue using services of the online system.

SUMMARY

An online system customizes video conversations between users of the online system by providing graphics to be overlaid on video streams. During video conversations, the online system presents composite views of a video or an image to the participating users via displays of client devices, which may be part of an augmented reality (AR) environment. A composite view may combine (i) a video or an image with (ii) one or more graphics. For instance, a composite view may include visual representations of the users and one or more types of graphics such as masks and props that the users can wear or interact with in the environment of the video conversation. Users may be encouraged to interact with the graphics included in the composite view, which can promote an engaging video conversation.

In one embodiment, a method receives a video stream from a client device of a user of an online system. A plurality of graphics provided at least in part by a plurality of users of the online system is identified. A set of candidate graphics is determined by filtering the plurality of graphics based at least in part on user information of the user and by determining that, for at least one graphic of the set of candidate graphics, a corresponding user that provided the graphic is connected to the user on the online system. The set of candidate graphics is provided for presentation to the user on the client device. A selection from the user for a candidate graphic of the set of candidate graphics is received. A composite view generated by overlaying the candidate graphic on the video stream is provided for presentation to the user on the client device.

BRIEF DESCRIPTION OF DRAWINGS

Figure (FIG. 1 is a diagram of a system environment for customizing graphics for video conversations according to one embodiment.

Figure 1:
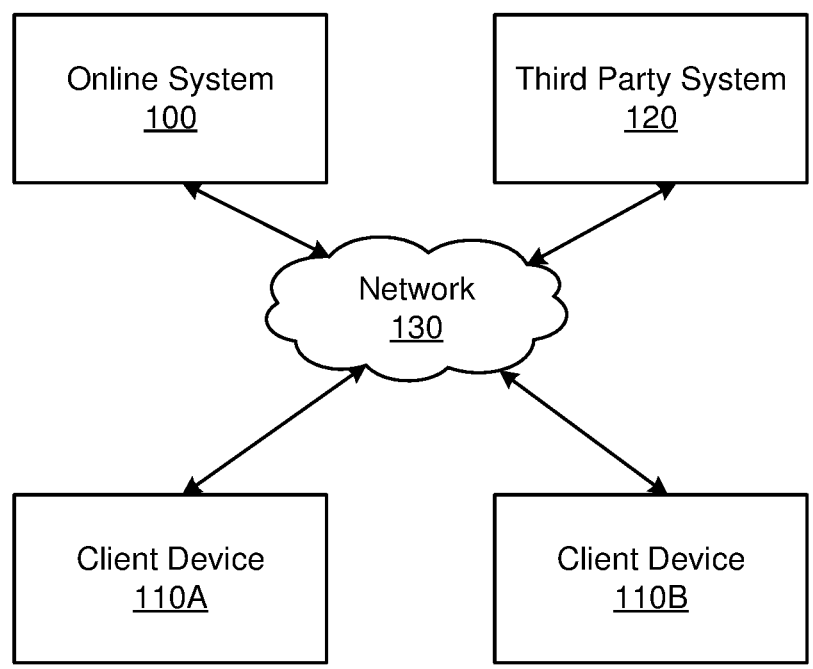

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure (FIG.) 1 is a diagram of a system environment for customizing graphics for video conversations according to one embodiment. The system environment includes an online system 100, one or more client devices such as client device 110A and 110B, and one or more third party systems 120, connected to each other via a network 130. The client devices 110A and 110B may be collectively referred to herein as client devices 110, or individually as a client device 110. In other embodiments, different and/or additional entities can be included in the system environment.

The online system 100 allows users of the online system 100 to communicate or otherwise interact with each other and to access content. In particular, the online system 100 enables users to communicate via video conversations, which may be in an AR (augmented reality) environment including different types of graphics overlaid on a video stream. The graphics may be provided by users of the online system 100 (e.g., using cameras or other video capture devices that are part of, or connected to, the client devices 110 of the users) or by third party systems 120. Types of graphics include background graphics, masks, props, visual/particle effects, filters, and frames/borders. Background graphics represent graphical content that appears behind other content in a video stream in a composite view, while other type of graphical content may appear in the foreground and obscure other features of the video stream, for example as either imposed on top of a background graphic or in front of a user or a user's avatar. Some graphics may include both portions that appear in the foreground and other portions that appear in the background. The online system 100 may select candidate graphics for presentation to users based on received information about the users, for example, user profile information and information about actions performed by users on the online system 100 or a third party system 120.

In some embodiments, the online system 100 is a social networking system. Users join the online system 100 and add connections to other users to whom they desire to be connected (e.g., friends, co-workers, family members, etc.). The online system 100 may also enable users to explicitly express interest in objects and/or concepts, such as brands, products, celebrities, hobbies, sports teams, music, and the like. These interests may be used in a myriad of ways, including targeting graphics and personalizing the user experience (e.g., video conversations) on the online system 100 by showing relevant graphics based on shared connections, interests, affinities, or sentiments.

In some embodiments, the online system 100 maintains and stores a social graph to represent concepts and actions in the online system 100. The social graph includes nodes connected by a set of edges. Nodes represent users and other objects of the online system 100, such as web pages embodying concepts and entities, and edges connect the nodes. Each edge represents a particular interaction or connection between two nodes, such as a user expressing an interest in a content item shared by another user. As another example, an edge may represent a connection (e.g., a friendship type relationship) established between two users. As such, the social graph includes data representative of the social signals of the online system 100. In one embodiment, the online system 100 generates the edges of the social graph based on the observed actions of its users. The online system 100 may distinguish between direct and indirect connections based on a number of nodes between two users in the social graph, in some embodiments.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone, head-mounted display (HMD), virtual reality (VR) or augmented reality (AR) device, or another suitable device. A client device 110 is configured to communicate via the network 130. Client devices 110 may include electronic displays, cameras, microphones, speakers, and/or other components that enable users to participate in video conversations using the client devices 110. These components may also be external devices communicatively coupled to client devices 110. For example, an external video camera (e.g., a webcam) may be coupled to a client device 110 to capture a video stream, or an external display or projector may be coupled to a client device 110 to present video from received by the client device 110.

In one embodiment, a client device 110 executes an application allowing a user of the client device 110 to interact with the online system 100 or a third party system 120. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

A third party system 120 may provide graphics or other content for presentation to users via a client device 110. Each third party system 120 is associated with a server outside of the domain of the online system 100. In one embodiment, the third party system 120 communicates content from a server of the third party system 120 to a server of the online system 100. The content may include sponsored content and be created by the entity that owns the third party system 120. Such an entity may be a company or other type of organization offering a product (e.g., a tangible object or an intangible service) or message that the company wishes to promote.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (Wi-MAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

II. Example System Architecture

Figure 2:
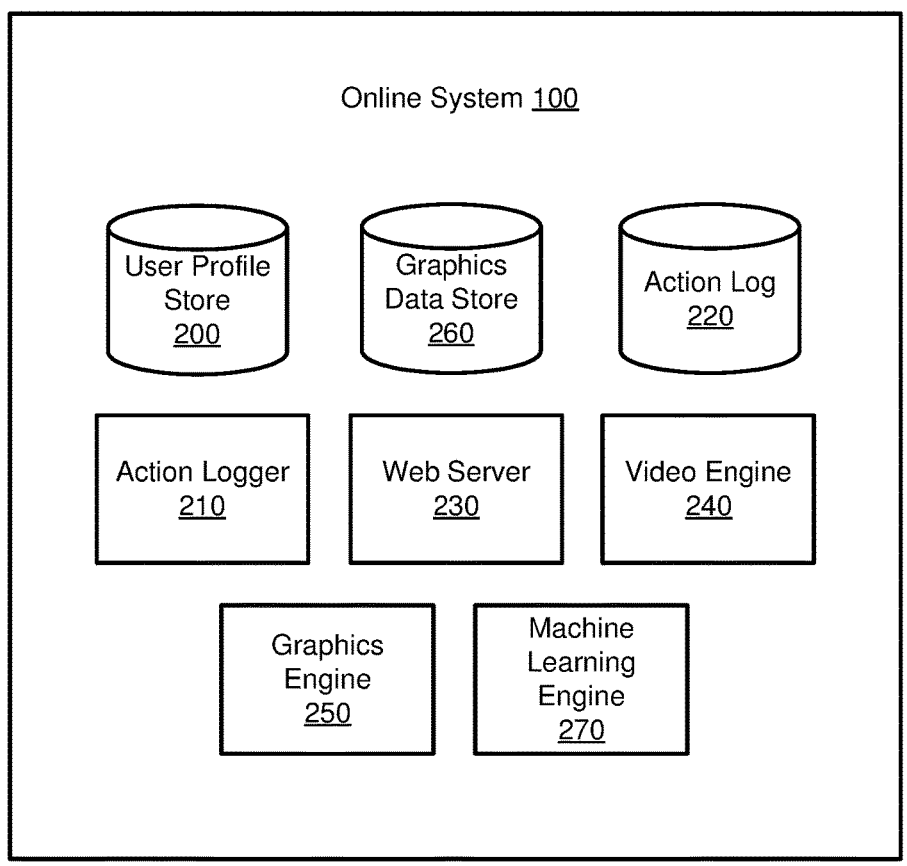
FIG. 2 is a block diagram illustrating the system architecture of an online system according to one embodiment.

FIG. 2 is a block diagram illustrating the system architecture of the online system 100 according to one embodiment. The online system 100 includes a user profile store 200, action logger 210, action log 220, web server 230, video engine 240, graphics engine 250, graphics data store 260, and machine learning engine 270. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic (e.g., age or gender), and other types of descriptive information, such as work experience, educational history, geographical location, hobbies or preferences, location and the like.

A user profile may also store other information provided by a user, for example, different types of graphics. A user profile in the user profile store 200 may also maintain references to actions by the corresponding user performed on the online system 100 or on a third party system 120, for example, selections of graphics during video conversations. The user profile store 200 can further store data (e.g., a social graph) describing one or more relationships between different users and allows users to specify their relationships with other users.

The user profile store 200 can store user profiles associated with individuals, as well as user profiles associated with entities such as businesses or organizations, e.g., that own a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, participating in a video conversation with another user, selecting or interacting with graphics during a video conversation, providing graphics to the online system 100, checking-in to physical locations, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track and record user actions on the online system 100, as well as actions on third party systems 120 that communicate information to the online system 100. In some embodiments, the online system 100 uses data from the action log 220 to infer interests or preferences of a user. Thus, the online system 100 can augment user information stored in the user profile store 200 and determine a more complete understanding of user preferences. The action log 220 can record information about client devices 110 that a user uses to interact with the online system 100. For example, the action log 220 records whether the user used a laptop computer or smartphone client device to interact with the online system 100. Further, the action log 220 may include information about the types of client devices 110, e.g., smartphone running an IOS® or ANDROID™ operating system.

The web server 230 links the online system 100 via the network 130 to the client devices 110. The web server 230 can serve graphics, images, video, and web pages, as well as other web-related content, such as JAVA®, FLASH®, XML and so forth. The web server 230 may receive and route messages between the online system 100, a client device 110, for example, instant messages, queued messages (e.g., email), text messages, short message service (SMS) messages, or messages sent using any other suitable messaging technique. A user may send a request to the web server 230 to upload content such as graphics that are stored in the user profile store 200 or the graphics data store 260. Additionally, the web server 230 may provide application programming interface (API) functionality to send data directly to native client device operating systems, such as IOS®, ANDROID™, WEBOS® or RIM®.

The video engine 240 enables users of the online system 100 to communicate with each other via video conversations using client devices 110. In an example use case, a user initiates a video conversation and invites one or more other users to join the video conversation. The video engine 240 provides notifications to the invited users to join the video conversation. During the video conversation, the video engine 240 provides a real-time display (e.g., a video display) for presentation on the client devices 110 of the users participating in the video conversation. The display may include visual representations of the participating users based on video streams captured by the client devices 110, as well as one or more graphics. The video engine 240 can also provide real-time audio messages to the client devices 110 during the video conversation. In some embodiments, the video engine 240 provides a VR or AR environment for users to communicate with one another.

The video engine 240 may determine parameters, metadata, or other types of information describing video conversations. For example, the video engine 240 determines a date and time at which users are participating in a video conversation, and geographical locations of the users' client devices 110 while the video conversation is occurring. The video engine 240 may also use video or image processing techniques known to one skilled in the art to determine additional metadata, e.g., to identify users in a video stream via facial recognition or to identify various types of objects via other types of detection algorithms. Other metadata determined by the video engine 240 may include, e.g., a number of users participating in a video conversation, network speeds of client devices 110 during a video conversation, or a duration of time since the start of a video conversation.

The graphics engine 250 generates and provides composite views to be included in displays presented on users' client devices 110 for video conversations. The composite view may include original video stream data captured by a client device 110 and augmented with graphics, e.g., that are not included in the original video stream data. For example, the composite view may include one or more visual representations of the participating users and one or more graphics. The graphics engine 250 receives graphics from users of the online system 100 or third party systems 120 and stores the graphics in the graphics data store 260.

In some embodiments, the graphics engine 250 receives a geographical location of a user's client device 110 when the user provides a graphic to the online system 100, and stores the geographical location with the graphic. Thus, the graphics engine 250 may infer that the graphic could be related to the geographical location.

In an example use case during a video conversation, the graphics engine 250 determines candidate graphics from the graphics available to the online system 100. The graphics engine 250 presents the candidate graphics to a user of the video conversation. In response to a selection of one of the candidate graphics, the graphics engine 250 includes the selected graphic in a composite view displayed during the video conversation. The graphics engine 250 determines the candidate graphics to present to the user based on information about the participating users from the online system 100, in some embodiments. In particular, the graphics engine 250 may retrieve user information from the user profile store 200 or the action log 220. The graphics engine 250 may filter the graphics for a given user by selecting candidate graphics provided by other users who are connected to the given user in the online system 100. The type of connection may be a first degree connection (i.e., direct), second degree connection (i.e., indirect), or another type of connection, and the filtering may further include the type (e.g., to favor graphics provided by users who are first degree connections over those provided by users who are second degree connections). By filtering graphics based on user connections, the graphics engine 250 can identify candidate graphics that are more likely to be selected by the given user, e.g., because the given user has a greater affinity for content provided by the user's connections relative to other content of the online system 100 in general. As another filtering criterion, the graphics engine 250 may select candidate graphics provided by other users located within a threshold distance from the geographical location of the given user when the given user is participating in the video conversation. The geographical locations of the other users may be determined based on their user profiles (e.g., a home location) or on their locations when providing the corresponding graphics (e.g., a location to which the users traveled). Candidate graphics filtered according to geographical relevance may be more likely selected by users.

The graphics engine 250 determines the candidate graphics to present to a user by generating scores for graphics and ranking the graphics based on the scoring, in some embodiments. The graphics engine 250 may generate scores based on predetermined rules or by using one or more machine learning models, which are further described below. The graphics engine 250 may present the candidate graphics to a user in order based on the scoring, e.g., graphics with greater scores are presented before, or more prominently than, graphics with lower scores.

The graphics engine 250 can organize candidate graphics for presentation to users, in some embodiments. In one use case, the graphics engine 250 organizes the candidate graphics based on characteristics of the candidate graphics, e.g., background graphics are sorted into a first group and visual effects are sorted into a second group. Other characteristics of graphics may include a sentiment, theme, image dimension or aspect ratio, image resolution, file extension, file size, file source, color histogram, tagged keywords, etc. The graphics engine 250 may receive graphics along with the characteristics provided by users or third party systems 120. Additionally, the graphics engine 250 may determine characteristics using image or video processing techniques, for example, determining that a graphic is a mask based on detecting facial features such as eyes and a nose.

In some embodiments, graphics including sponsored content have corresponding graphics values. For instance, one example of a graphic value of a graphic indicates an amount of compensation to be provided by a third party system 120 (e.g., associated with the graphic) to the online system 100 if the online system 100 presents the graphic to a user during a video conversation. The amount of compensation may be provided if any suitable condition is satisfied when the graphic is presented to a user, e.g., if the online system 100 provides the graphic for presentation in a set of candidate graphics or if the online system 100 receives an indication that a user performed a particular interaction with the graphic.

The machine learning engine 270 uses machine learning techniques to train one or more models for providing graphics that are customized for users, in some embodiments. The machine learning model may generate scores for graphics that indicate a likelihood that a given user will select the corresponding graphic. The graphics engine 250 may determine a set of candidate graphics by selecting graphics having scores greater than a threshold value. In one embodiment, the machine learning model generates scores for graphics that have been previously filtered by the graphics engine 250, for instance, based on user connections. This may be advantageous because generating scores for a filtered subset requires fewer computing resources, relative to scoring a larger sample of—or all—graphics available to the online system 100.

Machine learning techniques include, for example, linear regression, decision trees, support vector machines, classifiers (e.g., a Naive Bayes classifier), and gradient boosting, boosting for other algorithms (e.g., AdaBoost), neural net, logistic regression, memory-based learning, random forests, bagged trees, boosted trees, boosted stumps, etc. The machine learning models can initially be trained by extracting features associated with graphics presented to users of the online system 100, or graphics selected (or not selected) by the users, for which certain information has already been determined, and creating a feature vector. In some embodiments, example features for a given user and graphic include the degree of connection to the given user of another user that submitted the graphic, and/or a degree of match of the interests or demographic attributes (age, gender, etc.) of the given user to those of the other user that submitted the graphic. Dimensionality reduction (e.g., via linear discriminant analysis, principle component analysis, etc.) can be used to reduce the amount of data in the feature vector to a smaller, more representative core set of features. The training set for the machine learning model or classifiers that will be used is a subset of the overall data set that is representative of the data to be classified, including positive and negative examples on which the model is being trained. In supervised training, the training set items are labeled with the data that they are determined to represent. The training outputs models or classifiers that can then be used to identify this same data associated with other similar items that the model has not encountered before. The accuracy of the trained classifier is evaluated using a validation set that was formed as a disjoint set of the data for testing the trained classifiers to ensure the classifier generalizes to non-training data. Common metrics applied in accuracy measurement include: Precision=TP/(TP+FP) and Recall=TP/(TP+FN), where precision is how many the classifier correctly guessed (TP or true positives) out of the total it predicted (TP+FP or false positives) and recall is how many it correctly guessed (TP) out of the total that did represent the concept (TP+FN or false negatives). The F score (F-score=2*PR/(P+R)) unifies the two into one measure, and the system can reject or iterate on the model as needed based on the accuracy measurement result. Ultimately, the trained classifier is used to label unknown graphics based on the same features being extracted from these unknown graphics.

In one embodiment, the machine learning engine 270 trains the models using feature vectors and a training label. The feature vectors include information about graphics from various components of the online system 100 and/or third party systems 120. The machine learning engine 270 derives the feature vectors and training labels using information on the online system 100 or accessible to the online system 100. The training label indicates information that the machine learning model is trained to predict. For example, the training label could indicate whether a user selected or did not select a presented candidate graphic. In some embodiments, the machine learning engine 270 uses the training labels to partition information into positive and negative training sets. For example, the machine learning engine 270 labels a training set as positive if the training set includes information indicating that a user selected a candidate graphic presented to the user. As another example, the machine learning engine 270 labels another training set as negative if the training set includes information indicating that the user was presented with, but did not select, a candidate graphic.

III. Example Customized Graphics

Figure 3A:
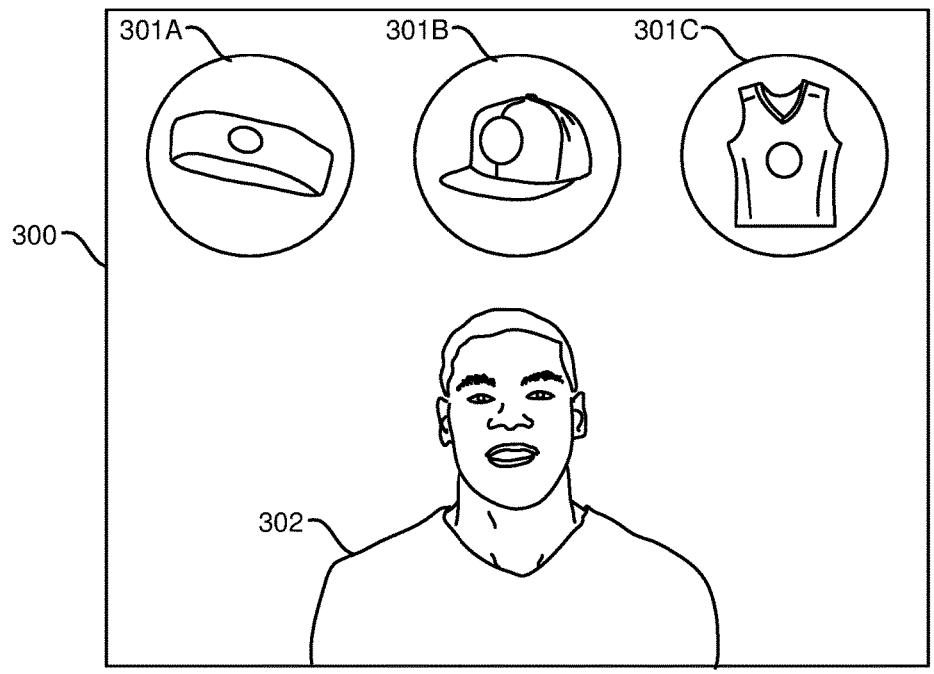
FIG. 3A is a diagram of a display of a user of an online system participating in a video conversation according to one embodiment.

FIG. 3A is a diagram of a display 300 of a user of the online system 100 participating in a video conversation according to one embodiment. The display 300 includes a visual representation 302 of the user, which is generated by the video engine 240 using a real-time video stream captured by the user's client device 110, in some embodiments. For example, the client device 110 has a camera (or another type of sensor) that captures a video stream of the user. In some embodiments, the video engine 240 may modify the video stream, e.g., by generating a "cartoonized" version of the users in the video stream, such as an avatar (alternate appearance of the user in the video stream tracking the general shape and/or movements of the user), or by applying other image processing techniques such as color filters. In addition, the visual representations may be a hybrid "cartoonized" version, e.g., the face of the user is based on the video stream, while the body of the user is "cartoonized."

In the example illustrated in FIG. 3A, the graphics engine 250 provides a set of three candidate graphics 301 for presentation to the user. In particular, the candidate graphics include a headband 301A, cap 301B, and jersey 301C. For purposes of illustration, each of the candidate graphics is shown in a circular "bubble." In other embodiments, the graphics engine 250 may present the candidate graphics in any other suitable representation. In addition or alternatively to including the candidate graphics, the graphics engine 250 may include a textual string representation of the graphics, e.g., displaying the strings "headband," "cap," and "jersey" as a menu in the display 300. The graphics engine 250 sorted the three candidate graphics together because each of them share at least a common characteristic, e.g., each of them is a type of sportswear. The graphics engine 250 may filter available graphics to determine a set of candidate graphics based on interests of the user, which are determined using user information and actions stored on the online system 100. In the example shown in FIG. 3A, the graphics engine 250 uses a filter to include basketball related graphics in response to determining that the user is a fan of basketball.

The user may select one or more of the candidate graphics for augmentation of the video stream by providing user input via a client device 110, such as by selecting one of the candidate graphics by pressing or mouse clicking on it, or by visually dragging it onto a relevant portion of the display (such as the visual representation 302 of the user). The user may also remove one or more of the candidate graphics that has previously been used to augment the video stream, e.g., by swiping away or moving a candidate graphic off the area of the display 300. In response to receiving an action to remove a given candidate graphic, the graphics engine 250 removes the given candidate graphic from presentation on the display 300. In addition, the graphics engine 250 may replace the removed graphic with another candidate graphic, e.g., the candidate graphic having the next greatest score among a set of scored and ranked candidate graphics.

In one embodiment, the graphics engine 250 determines the set of candidate graphics using a machine learning model trained using actions performed by the user or other users of the online system 100 (e.g., via the machine learning engine 270). The machine leaning model may predict that a user is likely to select or interact with a given graphic provided by a third party system 120 if the user previously interacted with an object associated with the same third party system 120. For instance, if the user visited a brand page of a local sports team (i.e., third party system 120) or commented on a photo posted by the sports team, the machine learning model may indicate that the user is likely to be interested in sportswear provided by the team. The machine learning model may also determine that a strength of the user's affinity for the sports team is proportional to a number of interactions performed by the user's connections on the online system 100 with objects associated with the sports team. Additionally, the machine leaning model may predict that the user is more likely to select graphics that were more frequently selected or interact with by other users of the online system 100, which may include the user's connections or another sample population of users.

Figure 3B:
FIG. 3B is a diagram of a display of a graphic overlaid on a video stream of a user of the online system according to one embodiment.

FIG. 3B is a diagram of a display 310 of a graphic overlaid on a video stream of a user of the online system 100 according to one embodiment. As previously described with respect to FIG. 3A, the user may select one of the presented candidate graphics. In the example of FIG. 3B, the user selects the candidate graphic of the cap 301B shown in FIG. 3A. In response to the selection, the graphics engine 250 generates a composite view by overlaying the cap graphic on the visual representation of the user. The video engine 240 provides the composite view for presentation in the display 310. The graphics engine 250 may associate certain graphics with predetermined designated portions of visual representations of users. For example, caps are normally worn on people's heads, so the graphics engine 250 associates the graphic of the cap with the designated portion of a head of a visual representation of a user in the video conversation.

Figure 3C:
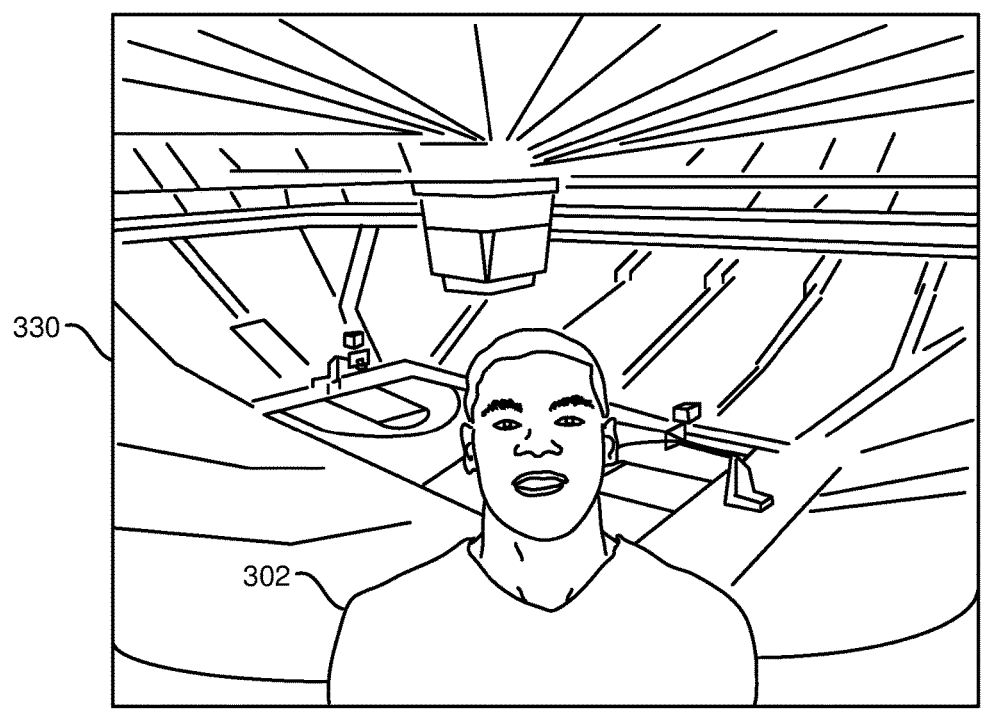
FIG. 3C is a diagram of a display of a background graphic overlaid on a video stream of a user of the online system according to one embodiment.

FIG. 3C is a diagram of a display 330 of a background graphic overlaid on a video stream of a user of the online system 100 according to one embodiment. In contrast to the candidate graphic of the cap shown in FIG. 3B, the background graphic (a basketball court) is included in the background of a composite view generated by the graphics engine 250. That is, the visual representation 302 of the user is overlaid on the background graphic. A machine learning model may predict that a given user is likely to select background graphics related to a current location of the given user, locations recently or previously visited by the given user, locations visited by other users within the same geographical region (e.g., a city or state), locations visited by users with similar demographics (e.g., college students or professionals with similar occupations), or locations visited by close connections of the user on a social network (e.g., first degree connections). For example, the machine learning model determines that the user shown in FIG. 3C is likely interested in a candidate background graphic of a basketball court because the user recently attended a basketball game or is nearby (or inside) a basketball venue. In some embodiments, the graphics engine 250 may generate a composite view that overlays other graphics such as visual or particle effects on a background graphic. For instance, the graphics engine 250 could overlay stadium lighting effects on the basketball court background graphic, or overlay additional graphics in the scoreboard or banner sections shown in the basketball court background graphic.

IV. Example Process Flow

Figure 4:
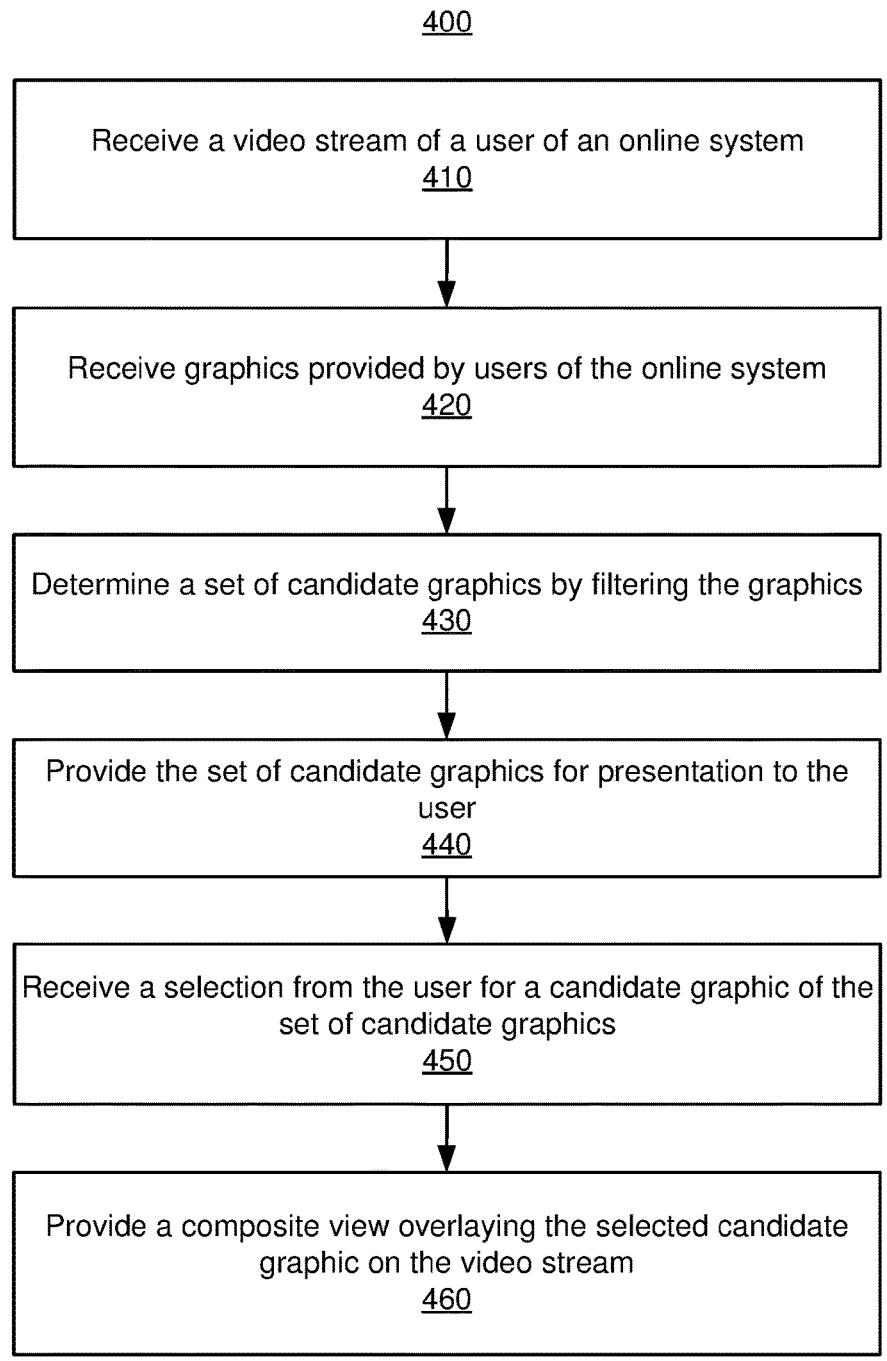
FIG. 4 is a flowchart illustrating a process for providing graphics for video conversations according to one embodiment.

FIG. 4 is a flowchart illustrating a process 400 for providing graphics for video conversations according to one embodiment. In some embodiments, the process 400 is performed by the online system 100—e.g., modules of the online system 100 described with reference to FIG. 2—within the system environment in FIG. 1. The process 400 may include different or additional steps than those described in conjunction with FIG. 4 in some embodiments or perform steps in different orders than the order described in conjunction with FIG. 4.

In one embodiment, the video engine 240 receives 410 a video stream of a user of the online system 100, e.g., from the camera of the client device 110 of the user. The graphics engine 250 receives 420 graphics provided by users of the online system 100 and/or by a third party system 120, e.g., by reading the graphics from the graphics data store 260. The graphics engine 250 determines 430 a set of candidate graphics by filtering the graphics. The filtering may be based on predetermined rules or a machine learning model trained based on feature vectors derived from actions performed by a population of users of the online system 100. The graphics engine 250 may also determine that for at least one of the candidate graphics, a corresponding user who provided the graphic is connected to the user on the online system 100, e.g., by a direct or indirect connection, so as to favor graphics submitted by the user's connections. The graphics engine 250 provides 440 the set of candidate graphics for presentation to the user on the client device 110. The candidate graphics may be provided in an order based on scores generated by the machine learning model, where the scores indicate a likelihood that the user will select the presented graphic. The graphics engine 250 receives 450 a selection from the user for a candidate graphic of the set of candidate graphics. The video engine 240 provides 460 a composite view generated by the graphics engine 250 (e.g., that of FIG. 3B) by overlaying the candidate graphic on the video stream for presentation to the user on the client device 110.

Though the online system 100 uses the process 400 to customize graphics for a video stream, the online system 100 may use a substantially same process to customize graphics for static images provided by users or third party systems 120, or for an image of a video stream.

For example, the online system 100 can receive an image from a client device 110 of one of its users. The online system 100 can identify graphics provided by its users, or by a third party system 120, determine a set of candidate graphics to present to the user, and provide the candidate graphics for presentation to the user, in a manner similar to that described above. Upon receiving a selection of the user from among the presented candidate graphics, the online system 100 provides a composite view incorporating the selected candidate graphic, such as by overlaying the candidate graphic on the image.

V. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a server of an online system, a video stream from a client device of a user of the online system;
   determining user information of the user based on actions performed by the user stored in the online system;
   identifying a plurality of graphics provided at least in part by a plurality of users of the online system;
   determining a set of candidate graphics by filtering the plurality of graphics based at least in part on the user information of the user and by determining that, for at least one graphic of the set of candidate graphics, a corresponding user that provided the graphic is connected to the user on the online system;
   for each graphic of the set of candidate graphics, generating a score for the graphic indicating a likelihood of the user selecting the graphic;
   providing, by the server to the client device, the set of candidate graphics for presentation to the user on the client device in an order based on the scores;
   receiving, by the server from the client device, a selection for a candidate graphic of the set of candidate graphics; and
   providing, by the server to the client device, a composite view generated by overlaying the selected candidate graphic on the video stream for presentation to the user on the client device.

2. The method of claim 1, wherein the scores are generated by a model trained based at least in part on feature vectors derived from actions performed by a population of users of the online system.

3. The method of claim 2, wherein the actions performed by the population of users of the online system include a plurality of selections of graphics of the plurality of graphics to be included in composite views presented to the population of users.

4. The method of claim 1, wherein each graphic of the set of candidate graphics is associated with one or more characteristics, and wherein filtering the plurality of graphics based at least in part on user information describing the user comprises:
   determining interests of the user based on the user information; and
   determining, for a graphic of the set of candidate graphics, that the corresponding one or more characteristics of the graphic matches at least one of the interests of the user.

5. The method of claim 1, wherein the plurality of graphics is provided further by at least a third party system, wherein the set of candidate graphics further includes a graphic provided by the third party system, and wherein the user information indicates that the user interacted with an object of the online system associated with the third party system.

6. The method of claim 1, wherein the composite view includes a visual representation of the user, and wherein the selected candidate graphic is overlaid on at least a portion of the visual representation of the user.

7. The method of claim 1, further comprising:
determining a background portion of the video stream, wherein the composite view is generated further by applying a visual effect of the selected candidate graphic to at least the background portion.

8. A computer-implemented method comprising:
receiving, by a server of an online system, an image from a client device of a user of the online system;
determining user information of the user based on actions performed by the user stored in the online system;
identifying a plurality of graphics provided at least in part by a plurality of users of the online system;
determining a set of candidate graphics by filtering the plurality of graphics based at least in part on the user information of the user and by determining that, for at least one graphic of the set of candidate graphics, a corresponding user that provided the graphic is connected to the user on the online system;
for each graphic of the set of candidate graphics, generating a score for the graphic indicating a likelihood of the user selecting the graphic;
providing, by the server to the client device, the set of candidate graphics for presentation to the user on the client device in an order based on the scores;
receiving, by the server from the client device, a selection for a candidate graphic of the set of candidate graphics; and
providing, by the server to the client device, a composite view generated by overlaying the selected candidate graphic on the image for presentation to the user on the client device.

9. The method of claim 8, wherein the scores are generated by a model trained based at least in part on feature vectors derived from actions performed by a population of users of the online system.

10. The method of claim 8, wherein each graphic of the set of candidate graphics is associated with one or more characteristics, and wherein filtering the plurality of graphics based at least in part on user information describing the user comprises:
determining interests of the user based on the user information; and
determining, for a graphic of the set of candidate graphics, that the corresponding one or more characteristics of the graphic matches at least one of the interests of the user.

11. A non-transitory computer-readable storage medium storing instructions that when executed by a processor cause the processor to perform steps including:
receiving, by a server of an online system, a video stream from a client device of a user of an online system;
determining user information of the user based on actions performed by the user stored in the online system;
identifying a plurality of graphics provided at least in part by a plurality of users of the online system;
determining a set of candidate graphics by filtering the plurality of graphics based at least in part on the user information of the user and by determining that, for at least one graphic of the set of candidate graphics, a corresponding user that provided the graphic is connected to the user on the online system;
for each graphic of the set of candidate graphics, generating a score for the graphic indicating a likelihood of the user selecting the graphic;
providing, by the server to the client device, the set of candidate graphics for presentation to the user on the client device in an order based on the scores;
receiving, by the server from the client device, a selection from the user for a candidate graphic of the set of candidate graphics; and
providing, by the server to the client device, a composite view generated by overlaying the selected candidate graphic on the video stream for presentation to the user on the client device.

12. The non-transitory computer readable storage medium of claim 11, wherein the scores are generated by a model trained based at least in part on feature vectors derived from actions performed by a population of users of the online system.

13. The non-transitory computer readable storage medium of claim of claim 12, wherein the actions performed by the population of users of the online system include a plurality of selections of graphics of the plurality of graphics to be included in composite views presented to the population of users.

14. The non-transitory computer readable storage medium of claim 11, wherein each graphic of the set of candidate graphics is associated with one or more characteristics, and wherein filtering the plurality of graphics based at least in part on user information describing the user comprises:
determining interests of the user based on the user information; and
determining, for a graphic of the set of candidate graphics, that the corresponding one or more characteristics of the graphic matches at least one of the interests of the user.

15. The non-transitory computer readable storage medium of claim 11, wherein the plurality of graphics is provided further by at least a third party system, wherein the set of candidate graphics further includes a graphic provided by the third party system, and wherein the user information indicates that the user interacted with an object of the online system associated with the third party system.

16. The non-transitory computer readable storage medium of claim 11, wherein the composite view includes a visual representation of the user, and wherein the selected candidate graphic is overlaid on at least a portion of the visual representation of the user.

17. The non-transitory computer readable storage medium of claim 11, having further instructions that when executed by the processor cause the processor to:
determining a background portion of the video stream, wherein the composite view is generated further by applying a visual effect of the selected candidate graphic to at least the background portion.

* * * * *